July 20, 1926.

M. TÉTARD 1,593,316

COMBINATION PLANING AND MOLDING MACHINE

Filed Sept. 9, 1924  2 Sheets-Sheet 1

Witnesses
Jean Germain
Jean Maureau

Inventor
Marius Tétard

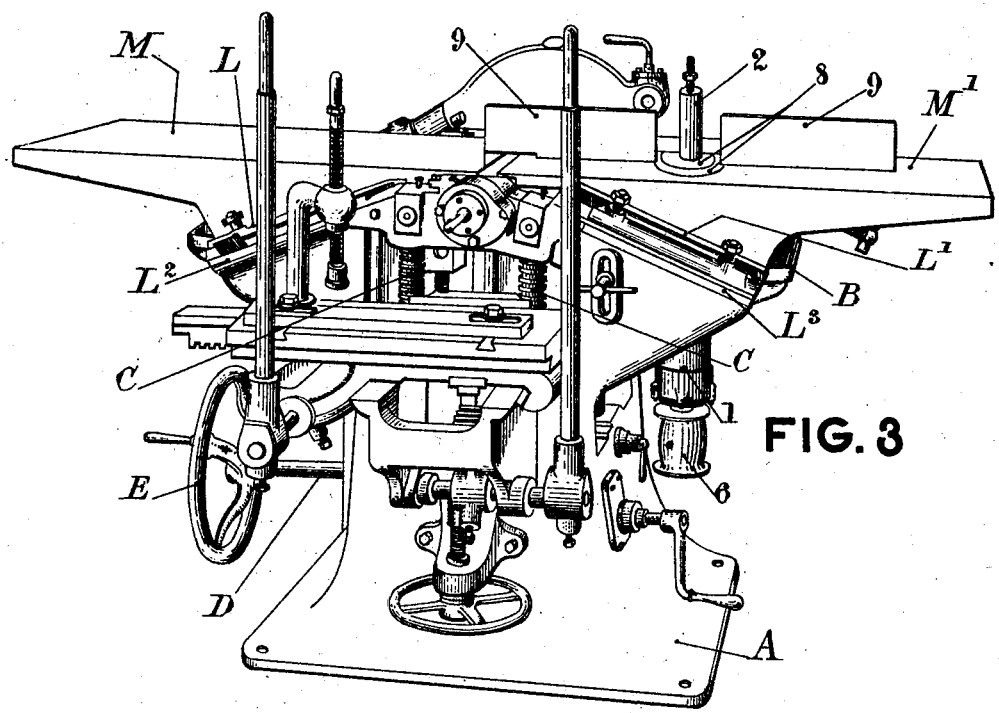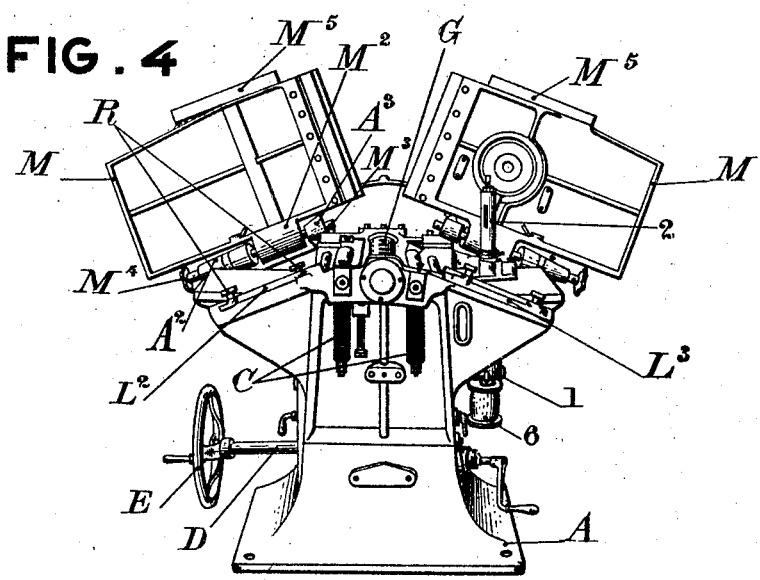

Patented July 20, 1926.

1,593,316

UNITED STATES PATENT OFFICE.

MARIUS TÉTARD, OF LYON, FRANCE.

COMBINATION PLANING AND MOLDING MACHINE.

Application filed September 9, 1924, Serial No. 736,775, and in France September 20, 1923.

This invention relates to a combination planing and molding machine in which the shaft of a vertical movable turret is mounted inside a casing carried by the planing table and with which it moves, thus allowing for easy and rapid regulation with respect to this table of the relative height of the turret shaft above the polishing table.

In this machine the two parts forming the polishing table may be raised longitudinally by pivoting them about hinges arranged along the side of the base of the machine so that the planing table arranged underneath may be completely uncovered either for cleaning and removal of shavings or to facilitate certain classes of work.

When the two parts forming the polishing table are in their normal position their relative distance apart and the height of the table above the tool carrying cylinder are regulated by means of two inclined planes sliding in guides correspondingly inclined carried by the frame. This movement is obtained by a screw the rotation of which causes the backward or forward movement of a nut affixed to the table. The locking of this latter in any position is provided for by locking bolts.

The invention will be described with reference to the accompanying drawings.

Figure 1:
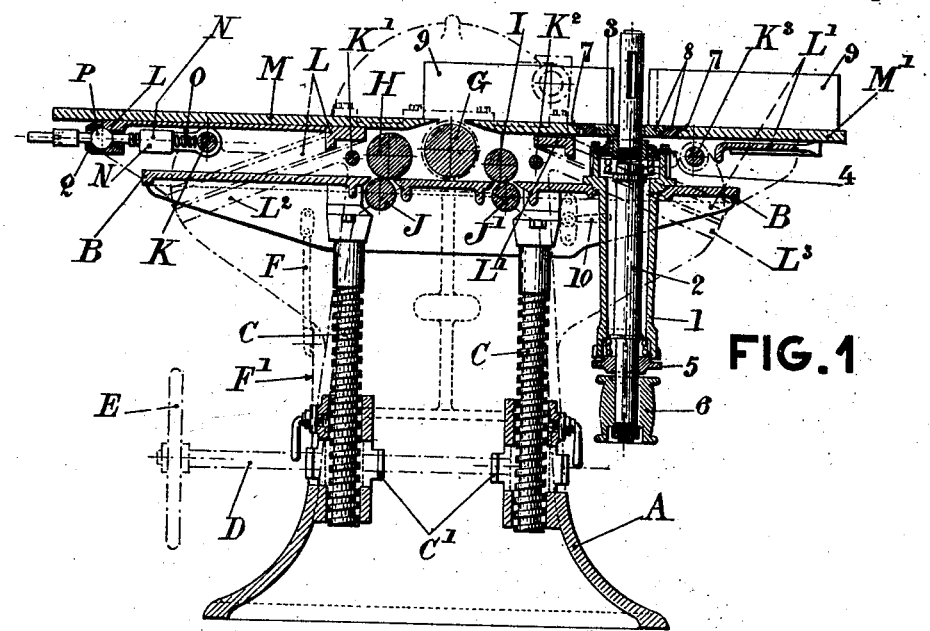
Figure 2:
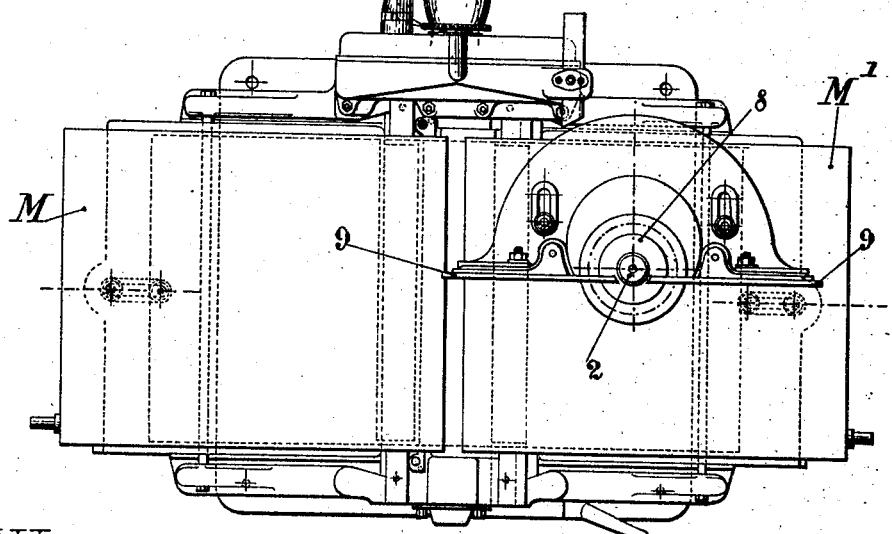

Fig. 1 is a vertical section.
Fig. 2 is a plan.
Figs. 3 and 4 are perspective views. In Fig. 3 the polishing table is lowered into the working position and in Fig. 4 the two parts which form the table are raised to allow for the uncovering of the planing table.

In the accompanying drawings the machine has a base A and planing table B carried by two helical screws C engaging nuts C' operated by a hand wheel E. To the table B is affixed a pointer F which is moved over a scale F¹ graduated in millimetres and carried by the base A, to indicate the thickness of the wood to be planed.

A cylindrical tool carrier G planes the wood placed on the lower table B and finishes the wood on the table M M¹. A fluted roller H and a smooth roller I are carried by the base A arranged respectively at the feed and delivery ends of the machine for the wood and both controlled by gearing. Smooth rollers J, J¹ are carried by the table B. Cross supports K, K¹, K², K³ are affixed to the base A. Stops L, L¹ slide in dovetailed slots L², L³ formed in the base A for adjusting the height of the finishing table M M¹ above the tool carrier G. This regulation is obtained through a left-handed nut N carried by the cross supports K K³ carried by the base. This nut is traversed by a screw O provided with a ball and socket joint P, Q, which allows for the aligning of the nut and screw whatever the height of the table.

The same result is obtained by means of the arrangement shown in Fig. 4 which allows for the employment of the pivots for the upper table for regulating the height of the two parts which form it. For this purpose the table is provided with a flange M² which is mounted on a strong rod M³ to which it is affixed by two bolts. This rod itself rotates with little friction in two lugs A² and A³ carried by the base. It is hollow longitudinally and tapped at one end to receive a screwed rod affixed to a hand wheel M⁴, the hub of which bears on the lug A² so that the rotation of the hand wheel in either direction advances or withdraws the rod M³ and the half table affixed to it.

When the table is lowered its side M⁵ rests in the slot L² which ensures it being horizontal in all positions. It can be locked in position by bolts R.

The turret is formed with a shaft 2 carrying a driving pulley 6 and mounted in ball bearings arranged inside a casing 1, affixed by three bolts to the planing table B. The upper bearing is closed by a bush 3 forming a seating for the guide bracket carried by the turret. An upper packing gland 4 and a lower thrust stud 5 for supporting the bearing are also provided with packing to prevent dust from entering the casing 1.

The finishing table M¹ is formed with a slot 7 through which the shaft 2 projects. This slot is sufficiently large to allow for moving the turret and its casing out of the way if the whole width of the table is required either for planing or finishing. Movable tool holders 8 are mounted in the space between the shaft 2 and the sides of the slot 7 and other movable tool holders are provided in the same way mounted on the table B when the turret casing is raised. To the table M¹ is also affixed a movable adjustable guide 9 capable of approaching and receding from the shaft 2; finally a bolt 10 operated by a handle placed in the front of the machine allows for locking the planing table in the position required with relation to the turret.

What I claim as my invention and desire to secure by Letters Patent of the United States is:—

1. A combined planing and molding machine comprising in combination two planing tables mounted on the same base plate and arranged one above the other independent means for adjusting the heights of the two tables, a horizontal rotary tool carrier common to both tables, the said adjusting means for the upper table including a shaft on which said upper table is pivotally mounted so that said upper table can be lifted out of the way.

2. A combined planing and molding machine comprising in combination a planing table carried by screwed rods passing into the base plate, a second table arranged above the first, inclined guides carried by the base plate, and a shaft mounted on said guides and on which the upper table is pivotally mounted so that said upper table can be lifted out of the way.

3. A combined planing and molding machine as in claim 2 in which the upper table is in two halves and the position of the upper table on the inclined guides is regulated by a double nut engaging screwed rods carried by the table and by the base plate, a universal ball and socket joint being provided to allow for the adjustment for varying heights of the table and shafts are provided on the guides, on which shafts said upper table halves are pivotally mounted so that said halves can be lifted out of the way.

MARIUS TÉTARD.